United States Patent
Hu et al.

(10) Patent No.: US 10,989,895 B2
(45) Date of Patent: Apr. 27, 2021

(54) LENS DRIVING MECHANISM

(71) Applicant: TDK TAIWAN CORP., Yangmei Taoyuan (TW)

(72) Inventors: Chao-Chang Hu, Yangmei Taoyuan (TW); Chih-Wei Weng, Yangmei Taoyuan (TW); Shao-Kuang Huang, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 109 days.

(21) Appl. No.: 15/949,567

(22) Filed: Apr. 10, 2018

(65) Prior Publication Data
US 2018/0299641 A1    Oct. 18, 2018

Related U.S. Application Data

(60) Provisional application No. 62/485,571, filed on Apr. 14, 2017.

(30) Foreign Application Priority Data

Mar. 23, 2018 (CN) .......................... 201810245073.5

(51) Int. Cl.
*G02B 7/09* (2021.01)
*G02B 7/08* (2021.01)
*G02B 13/00* (2006.01)
*G02B 27/64* (2006.01)
*G02B 7/02* (2021.01)

(52) U.S. Cl.
CPC .............. *G02B 7/09* (2013.01); *G02B 7/022* (2013.01); *G02B 7/08* (2013.01); *G02B 13/0025* (2013.01); *G02B 27/646* (2013.01)

(58) Field of Classification Search
CPC .... G02B 27/646; G02B 7/08; G02B 13/0025; G02B 7/022; G02B 7/09; H02K 41/02
See application file for complete search history.

(56) References Cited

U.S. PATENT DOCUMENTS

| 8,072,691 | B2 * | 12/2011 | Chen ........................ G02B 7/04 359/704 |
| 9,028,159 | B2 * | 5/2015 | Pavithran ............... G03B 17/12 396/529 |
| 2010/0246035 | A1 * | 9/2010 | Yamashita ............. G02B 7/023 359/824 |
| 2013/0194491 | A1 * | 8/2013 | Kudo ....................... G02B 7/08 348/375 |

FOREIGN PATENT DOCUMENTS

CN            205861983 U       1/2017

OTHER PUBLICATIONS

Office Action dated Jul. 3, 2020 in Chinese Application No. CN201810245073.5/.

* cited by examiner

*Primary Examiner* — Joseph P Martinez
*Assistant Examiner* — Vipin Patel
(74) *Attorney, Agent, or Firm* — Muncy, Geissler, Olds & Lowe, P.C.

(57) ABSTRACT

A driving module is provided. The driving module includes a sensor module, a holder and at least three positioning components. The holder corresponds to the sensor module and is for holding an optical element. The positioning components are disposed between the sensor module and the holder.

14 Claims, 19 Drawing Sheets

LENS DRIVING MECHANISM

CROSS-REFERENCE TO RELATED APPLICATIONS

The present application claims priority to U.S. Provisional Patent Application No. 62/485,571, filed on Apr. 14, 2017, and China Patent Application No. 201810245073.5 filed on Mar. 23, 2018, which is incorporated by reference herein in its entirety.

BACKGROUND OF THE INVENTION

Field of the Invention

The invention relates to a driving module, and more particularly to a driving module for driving an optical element.

Description of the Related Art

Current mobile devices (e.g. mobile phones) normally include a digital-image capturing function, which is made possible through the miniaturization of optical element driving modules. An optical element driving module consists mainly of a holder assembly and a sensor module. However, larger tolerances may occur during the production and assembly of the parts of the driving module, especially when two elements are in face-to-face contact with each other. As a result, the parts in the driving module may be tilted, so the optical axis of the optical element may not be able to be perpendicular to the sensor. As a result, the captured image may be blurry.

Many methods have been tried in the industry to solve the tilting problem of the parts in the driving module, wherein an active alignment process is recognized as a relatively effective method. However, this process is complicated, and thereby requires a higher cost. As a result, how to overcome this problem and effectively solve the tilting problem of the driving module has become an important issue.

BRIEF SUMMARY OF THE INVENTION

In an embodiment of the present invention, a driving module is provided, which includes a sensor module, a holder assembly, and at least three positioning components. The holder assembly corresponds to the sensor module. The positioning components are disposed between the sensor module and the holder assembly. The sensor module includes a base, wherein the positioning components are integrally formed with the holder assembly or the base as one piece. The driving module further includes a filter disposed between the holder assembly and the sensor module. The positioning components abut the filter and may include a metal material.

In an embodiment of the present invention, the holder assembly includes one or more recesses disposed at a surface, of the holder assembly, corresponding to the sensor module. The positioning component and the recess have a same sidewall, wherein the holder assembly has a slightly rectangular shape, the recess and the positioning components are at corners of the holder assembly, and a polygonal area formed by the positioning components includes an optical axis of an optical element.

In another embodiment of the present invention, a driving module is provided, which includes a sensor module and a holder assembly. The holder assembly includes a metal bottom abutting the sensor module for holding an optical element. The metal bottom includes a recess at a surface of the metal bottom facing the sensor module.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

A driving module is discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The abovementioned and other technical contents, features and effects relating to the present invention are clearly shown in the description of a preferred embodiment with reference figures. The directional phrases, such as on, under, left, right, front or rear are the directions relative to the reference figures. As a result, the directional phrases are only for illustration and are not intended to restrict this invention.

Figure 1:
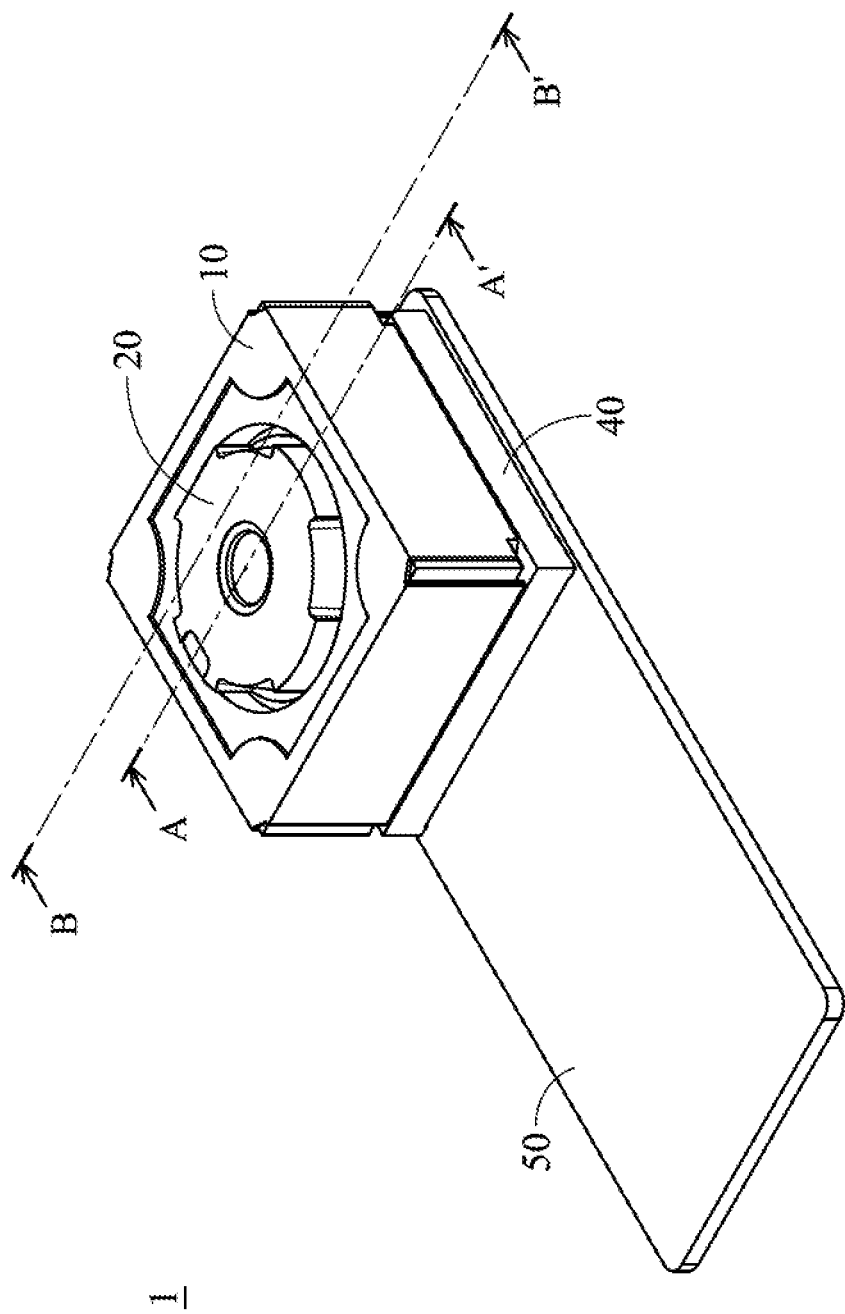
FIG. 1 is a perspective view of a driving module according to an embodiment of the present invention.
Figure 2:
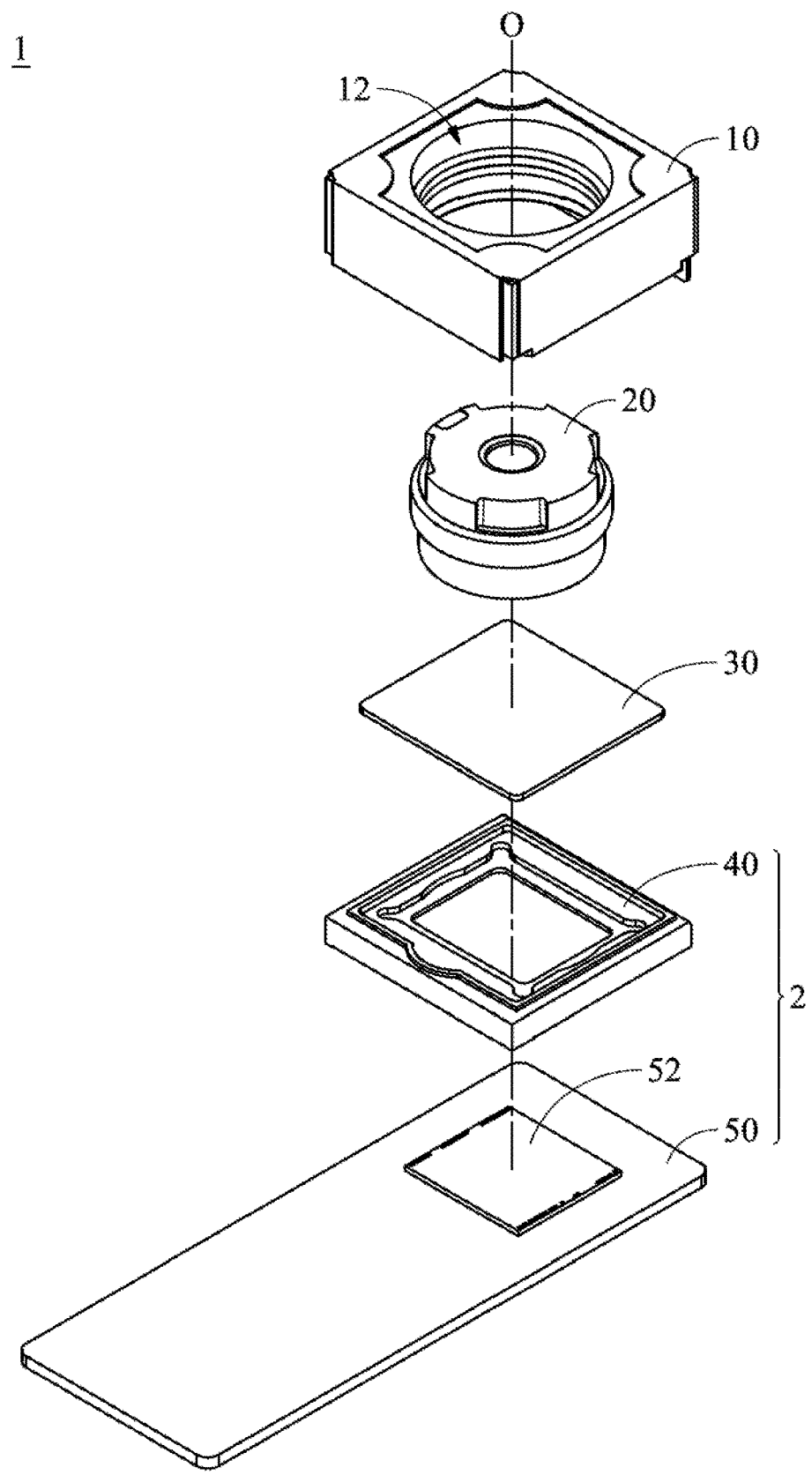
FIG. 2 is an exploded view of the driving module in FIG. 1.
Figure 3:
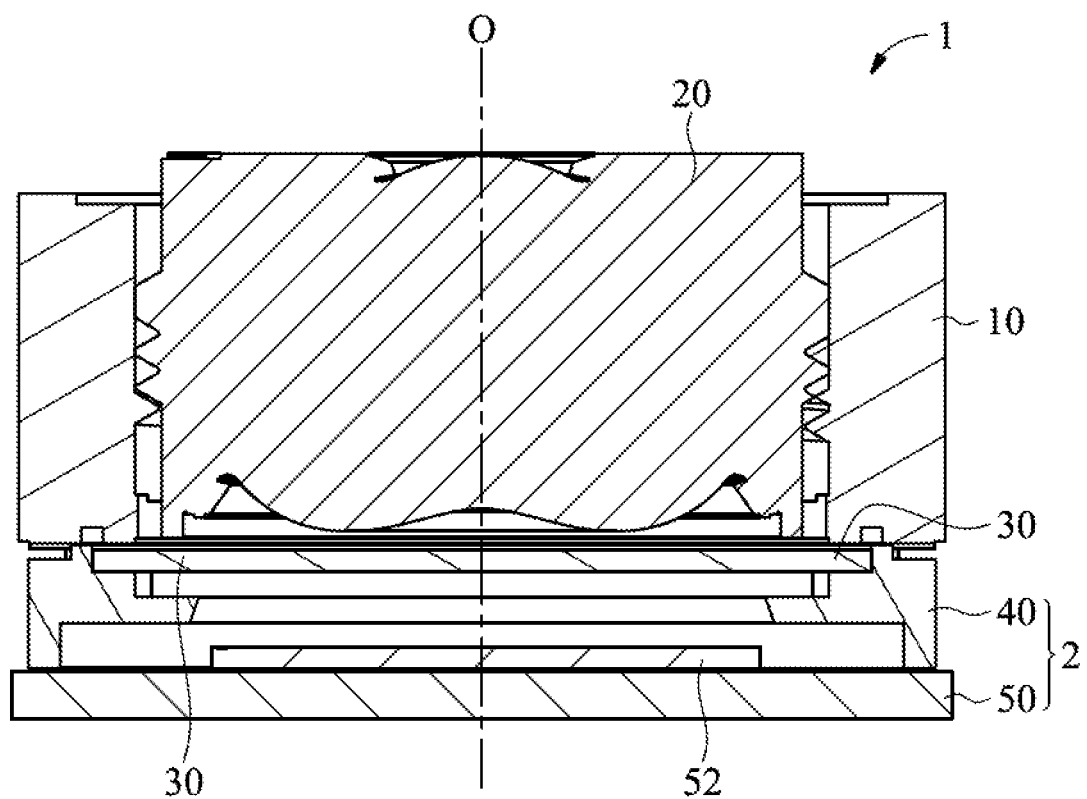
FIG. 3 is a cross-sectional view along line A-A' in FIG. 1.

Referring to FIGS. 1-3. FIG. 1 is a perspective view of a driving module 1 according to an embodiment of the present invention, FIG. 2 is an exploded view of the driving module 1 in FIG. 1, and FIG. 3 is a cross-sectional view along line A-A' in FIG. 1. As shown in FIGS. 1-3, in this embodiment, the driving module 1 mainly includes a holder assembly 10, an optical element 20, a filter 30, a base 40 and a substrate 50.

As shown in FIG. 2, the holder assembly 10 has a through hole 12, and an optical sensor 52 is disposed on the substrate 50. The optical element 20 (e.g. a lens) may be fixed in the through hole 12 (e.g. by securing, adhering, etc.), and an optical axis O of the optical element 20 corresponds to the center of the through hole 12 and the optical sensor 52. As a result, the optical element 20 disposed in the holder assembly 10 may perform image focusing in the direction of the optical axis O with the optical sensor 52. The holder assembly 10 may be formed of an optical sensor holder and a driving element (e.g. magnet, coils, etc., not shown) to allow the optical element 20 to move relative to the optical sensor 52, thereby achieving auto focus (AF) or optical image stabilization (OIS).

A filter 30 and a base 40 are disposed between the holder assembly 10 and the substrate 50. The base 40, substrate 50 and the optical sensor 52 form a sensor module 2 to detect the light passing through the optical element 20. The filter 30 is disposed on the base 40 and is separated from the optical sensor 52 on the substrate 50 by the base 40. The filter 30 is used for filtering the light which is received by the optical element 20 and propagates to the optical sensor 52, so the optical sensor 52 may only receive light with desired wavelength. As a result, the clarity of the image captured may be guaranteed. The base 40 is fixed on the substrate 50 and is used to hold other elements such as the filter 30.

Figure 4A:
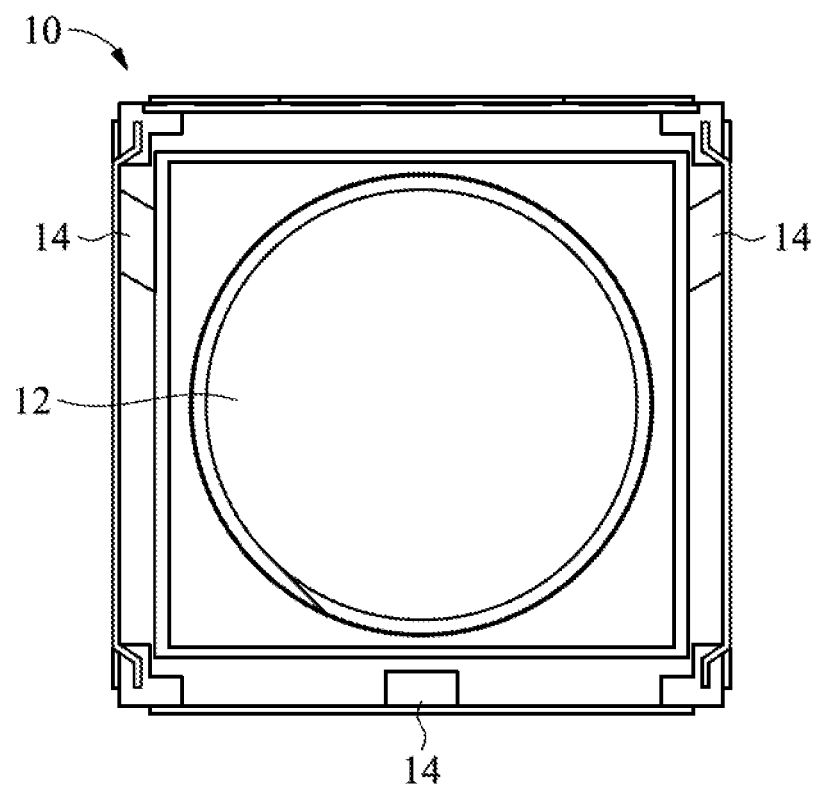
FIG. 4A illustrates some components of a driving module according to an embodiment of the present invention.
Figure 4B:
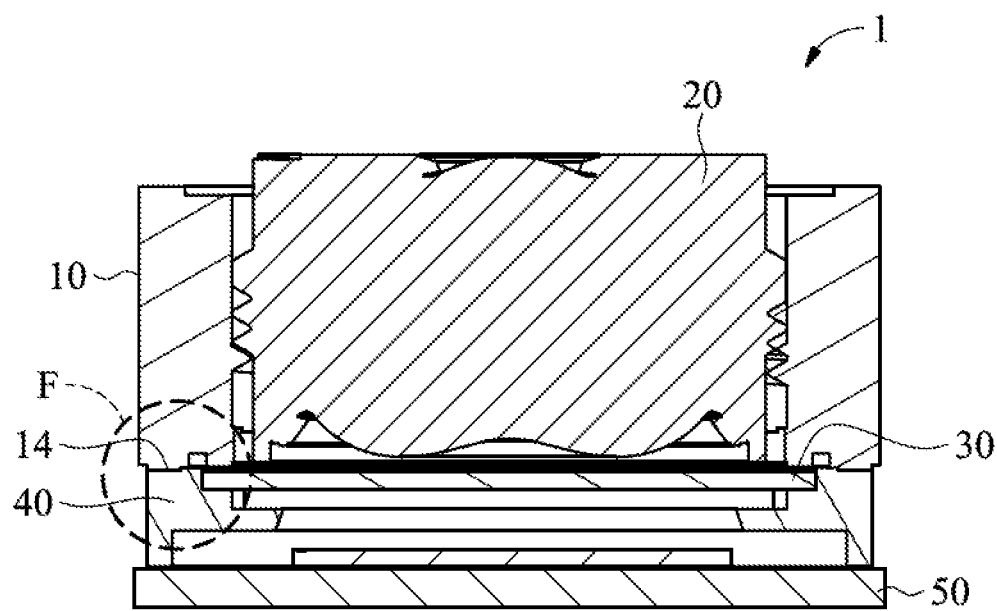
FIG. 4B is a cross-sectional view along line B-B' in FIG. 1.
Figure 4C:
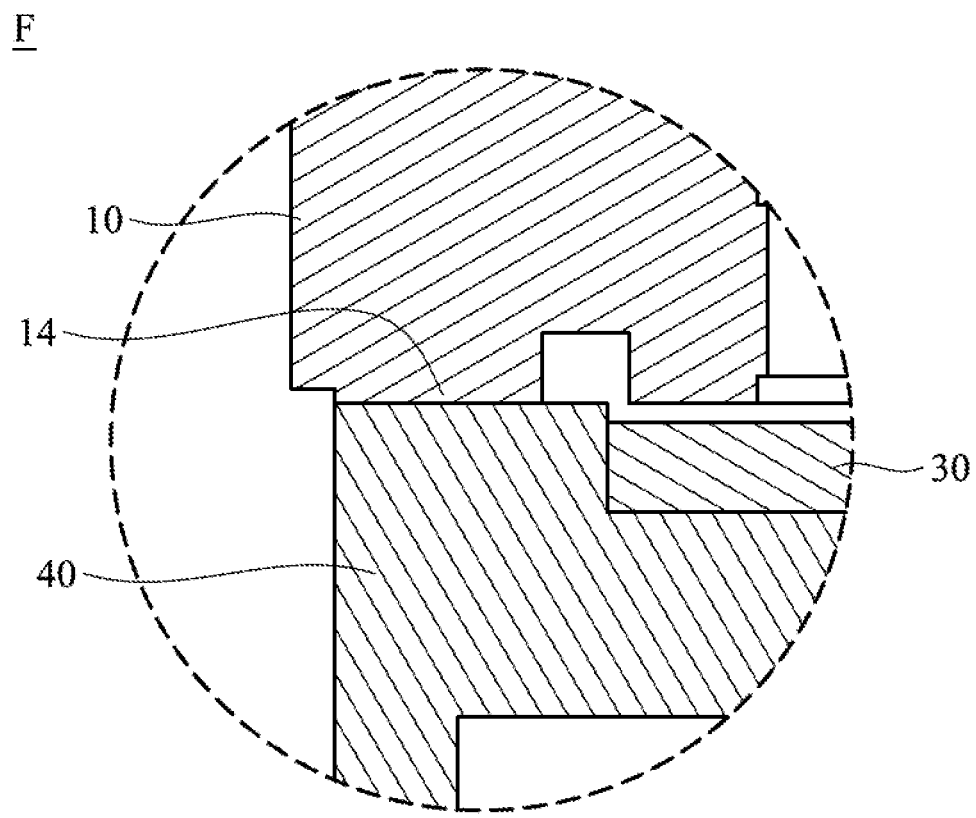
FIG. 4C is an enlarged view of the portion F in FIG. 4B.

FIGS. 4A-4C illustrate a driving module, according to an embodiment of the present invention. FIG. 4A is a bottom view of the holder assembly 10, FIG. 4B is a cross-sectional view along line B-B' in FIG. 1, and FIG. 4C is an enlarged view of the portion F in FIG. 4B. As shown in FIG. 4A, in this embodiment, three positioning components 14 are disposed on a surface of the holder assembly 10 which faces the sensor module 2, and the positioning components 14 are integrally formed with the holder assembly 10 as one piece. The positioning components 14 are disposed at sides of the holder assembly 10, which has a slightly rectangular shape, and is adjacent to corners of the holder assembly 10. As shown in FIGS. 4B and 4C, the positioning components 14 abut the base 40 at the same time.

The combination of the conventional holder assembly and base, which are in contact with each other by a surface contacting manner, may cause the contact surface to be uneven. On the other hand, the three positioning components 14 may be approximate to three points, wherein three points may form a flat plane, the plane formed by this configuration has a higher flatness, so its corresponding jig may be easier to control, and the optical axis O of the optical element 20 may pass through a triangular area formed by the connection of the three positioning components 14. Therefore, the parallelism that develops between the holding assembly 10 and the base 40 when the positioning components 14 are disposed between them may be higher than cases where the positioning components 14 are omitted. For example, after the driving module is assembled, the difference between the furthest and the nearest distances of the holder assembly 10 and the base 40 to the substrate 50 at their corresponding contact surfaces may be less than 15 μm, or the tilt angle between the optical element 20 to the substrate 50 may be less than 5 minutes of angle. Furthermore, the relative positions of the holder assembly 10 and the base 40 may be positioned by the positioning components 14, which may enhance the accuracy of assembly, thereby solving the problem of images being blurry due to the tolerance of the parts or assembly errors. The positioning components 14 are disposed on the sides of the slightly rectangular holder component 10 and are close to the corners of the holder assembly 10. As a result, the space at the corner may be effectively utilized to achieve mechanism miniaturization. Moreover, since only small adjustments are required for the jig used during assembly to achieve compensation, the cost of the process may be reduced.

In FIG. 4A, although the positioning components 14 are illustrated as a rectangular shape, it is only for illustration rather than limitation. For example, the positioning components 14 may be any possible shapes, such as a circle, a triangle, a polygon, etc., depending on design requirements. The height of the positioning components 14 may be between 30 μm to 100 μm. If the height of the positioning components 14 is less than 30 μm, the positioning function may be lost. If the height of the positioning components 14 is greater than 100 μm, it may be undesired for the miniaturization of the driving mechanism.

Figure 5A:
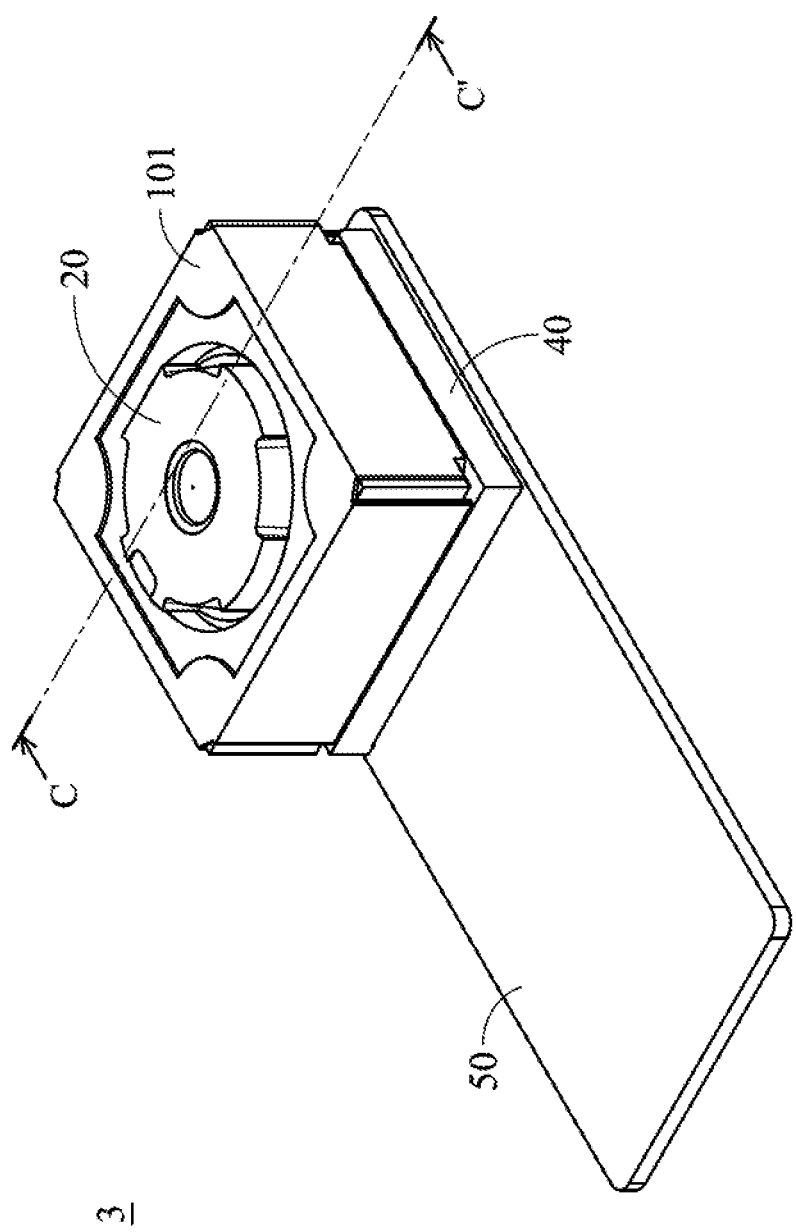
FIG. 5A is a perspective view of a driving module according to another embodiment of the present invention.
Figure 5B:
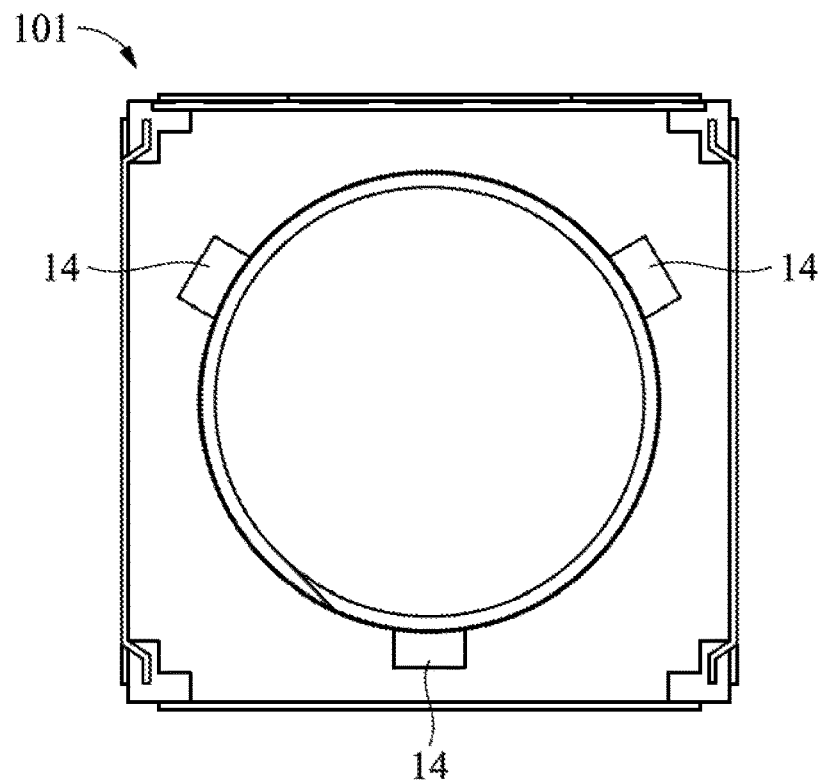
FIG. 5B illustrates some components of a driving module according to another embodiment of the present invention.
Figure 5C:
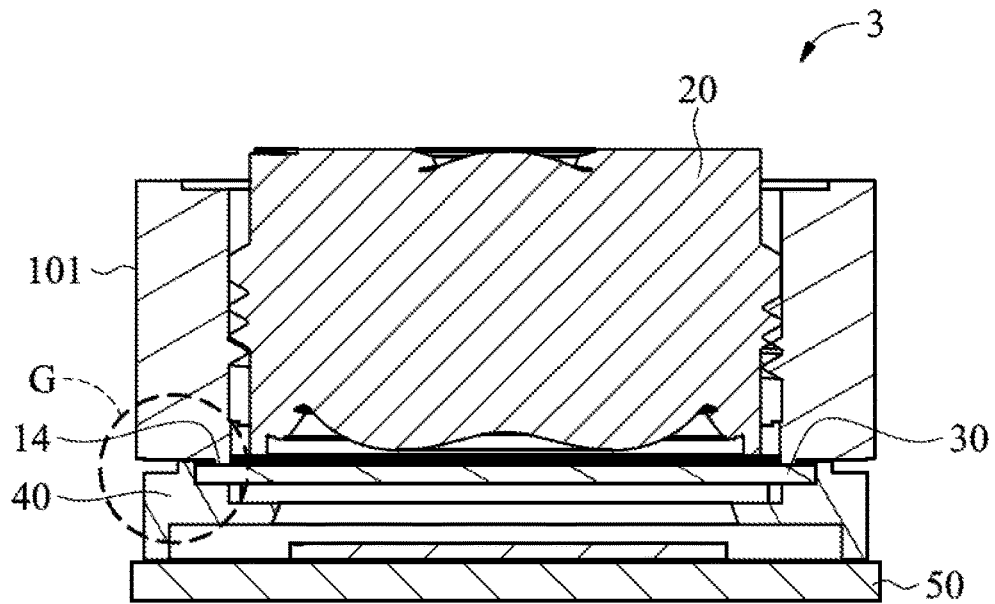
FIG. 5C is a cross-sectional view along line C-C' in FIG. 5A.
Figure 5D:
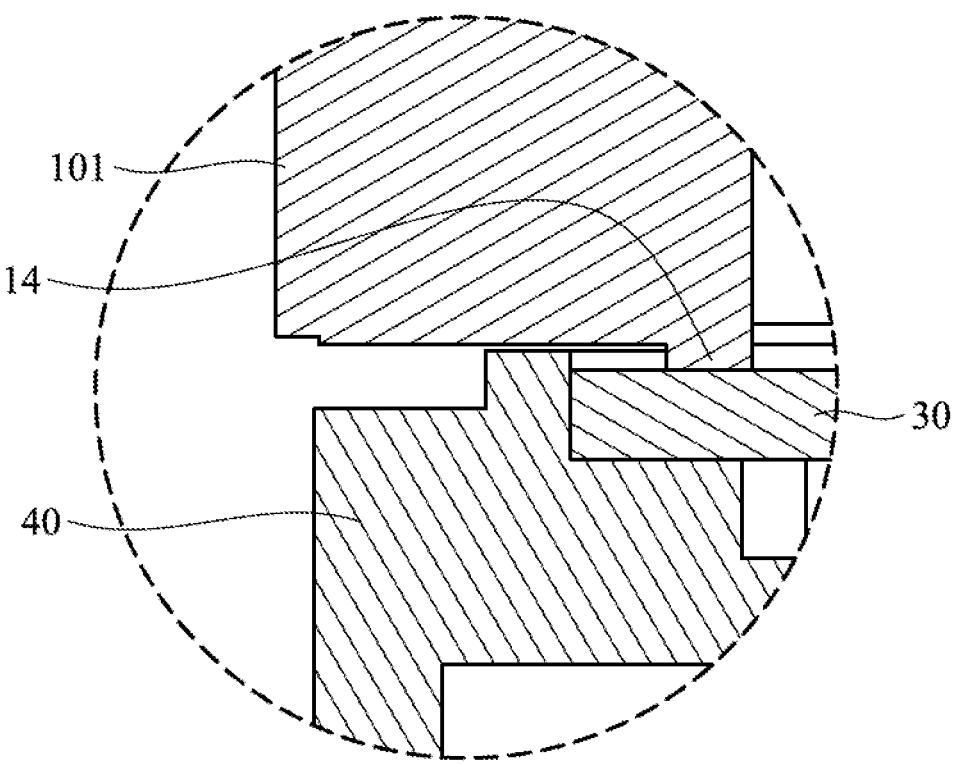
FIG. 5D is an enlarged view of the portion G in FIG. 5C.

FIGS. 5A-5D illustrate a driving module, according to another embodiment of the present invention. FIG. 5A is a perspective view of the driving module 3, FIG. 5B is a bottom view of a holder assembly 101 in the driving module 3, and FIG. 5C is a cross-sectional view along line C-C' in FIG. 5A, wherein line C-C' passes through the positioning components 14, and FIG. 5D is an enlarged view of the portion G in FIG. 5C. As shown in FIG. 5B, in this embodiment, the positioning components 14 are disposed at the edge, of the holder assembly 101, close to the through hole 12 rather than being disposed at the sides of the holder assembly 101, and the three positioning components 14 of the holder assembly 101 substantially form an isosceles triangle. As shown in FIGS. 5C-5D, the positioning components 14 may abut the filter 30 when assembled. Because the three positioning components 14 of the holder assembly 101 substantially form an isosceles triangle, the center of gravity of the driving module is close to that of the triangle, and the optical axis O of the optical element 20 is in this triangular area and is perpendicular to the optical sensor 52, thereby enhancing stability during assembly. The filter 30 has good flatness, so the parallelism between the elements may be enhanced through this assembly manner, thereby avoiding the problem of capturing blurry images because the component tilts during assembly.

Figure 6A:
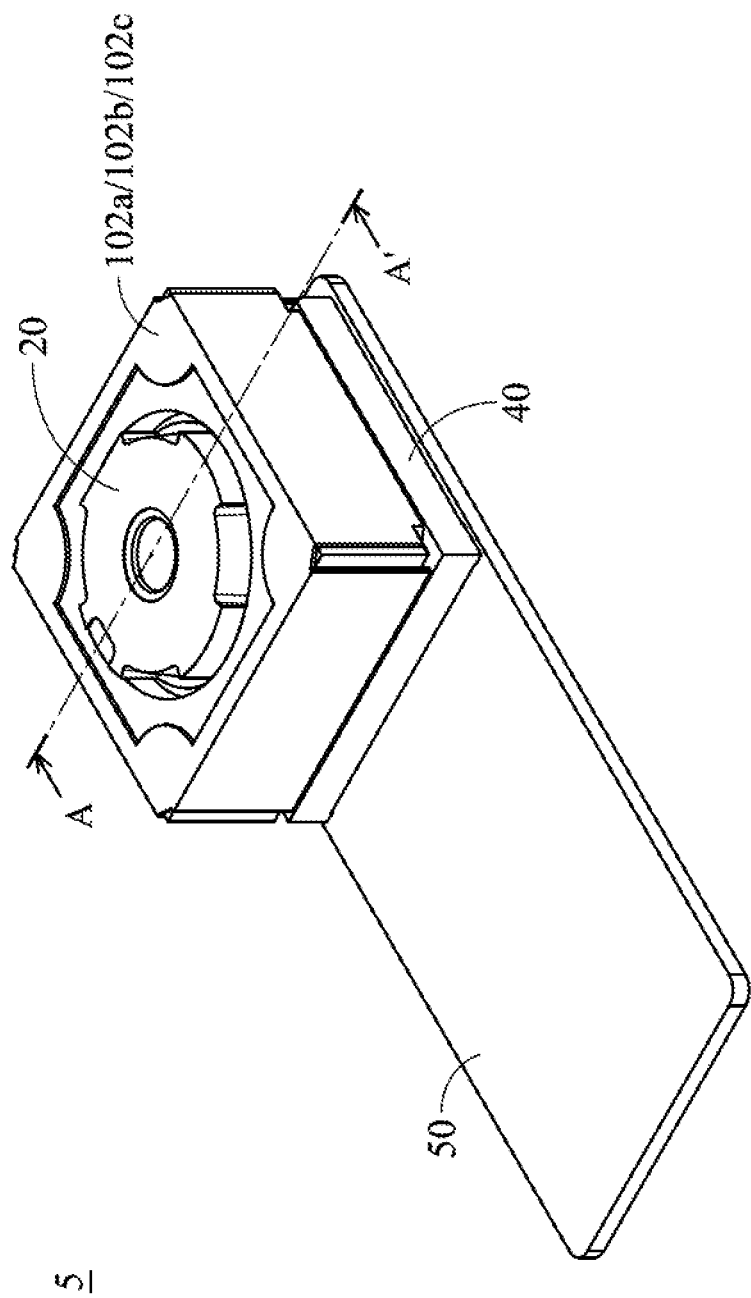
FIG. 6A is a perspective view of a driving module according to some other embodiments of the present invention.
Figure 6B:
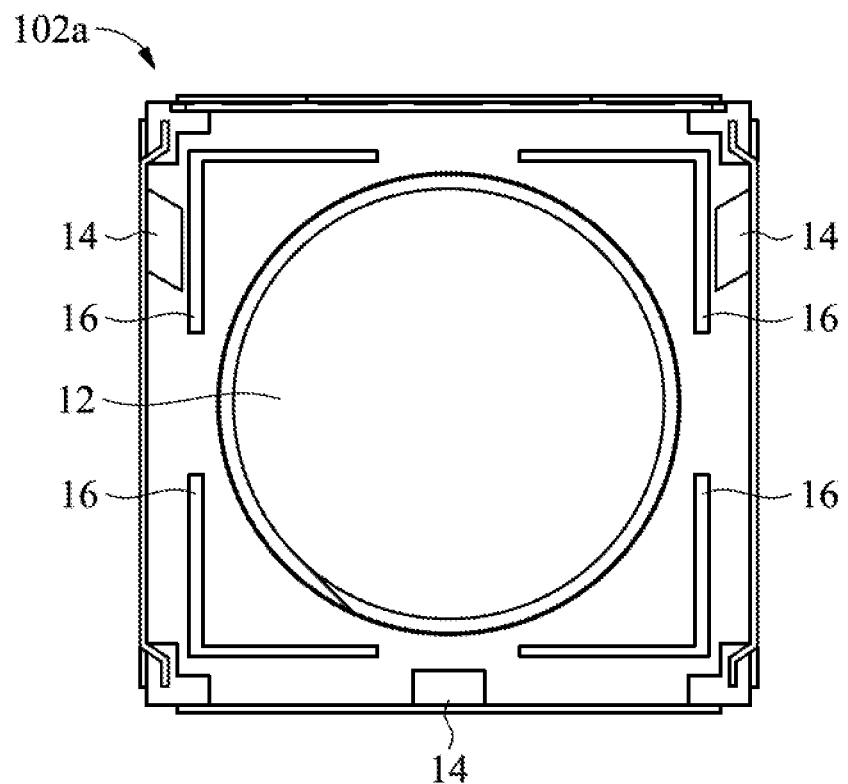
FIGS. 6B-6D illustrate some components of a driving module according to some other embodiments of the present invention.
Figure 6C:
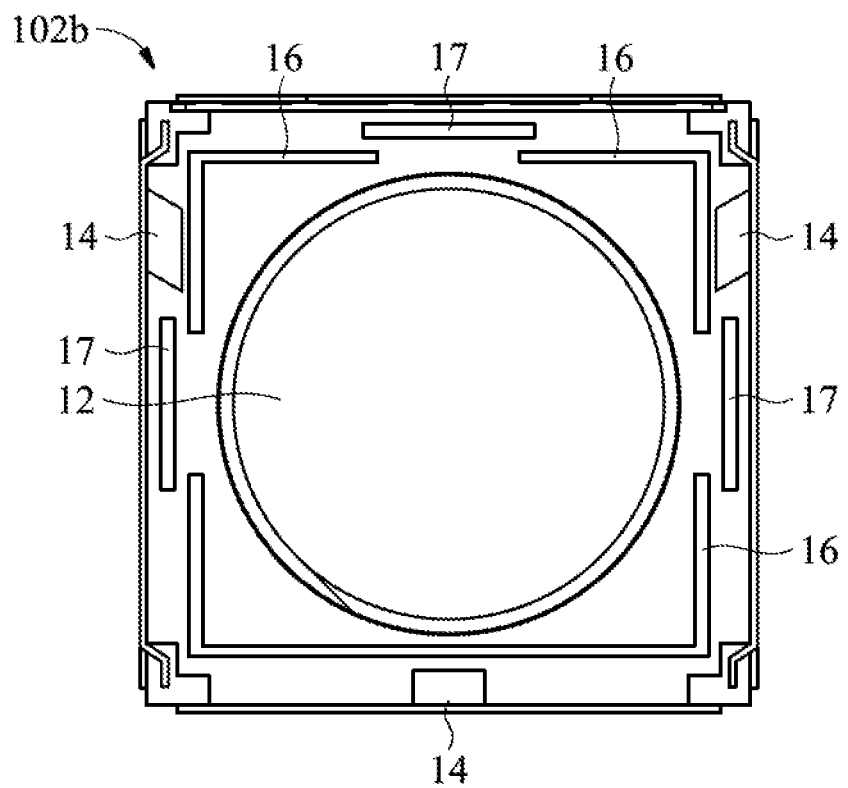
Figure 6D:
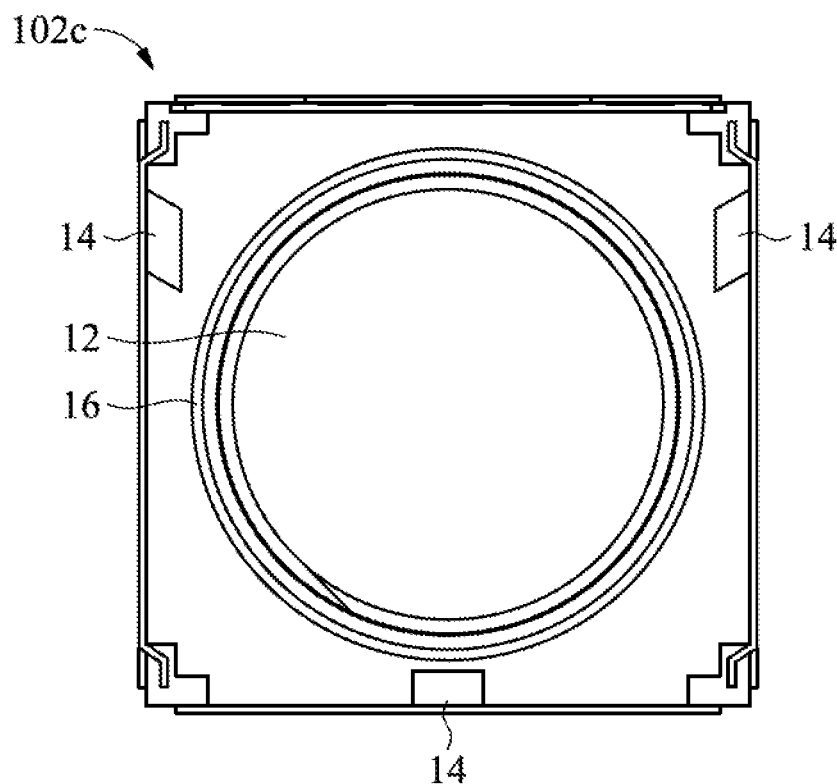
Figure 6E:
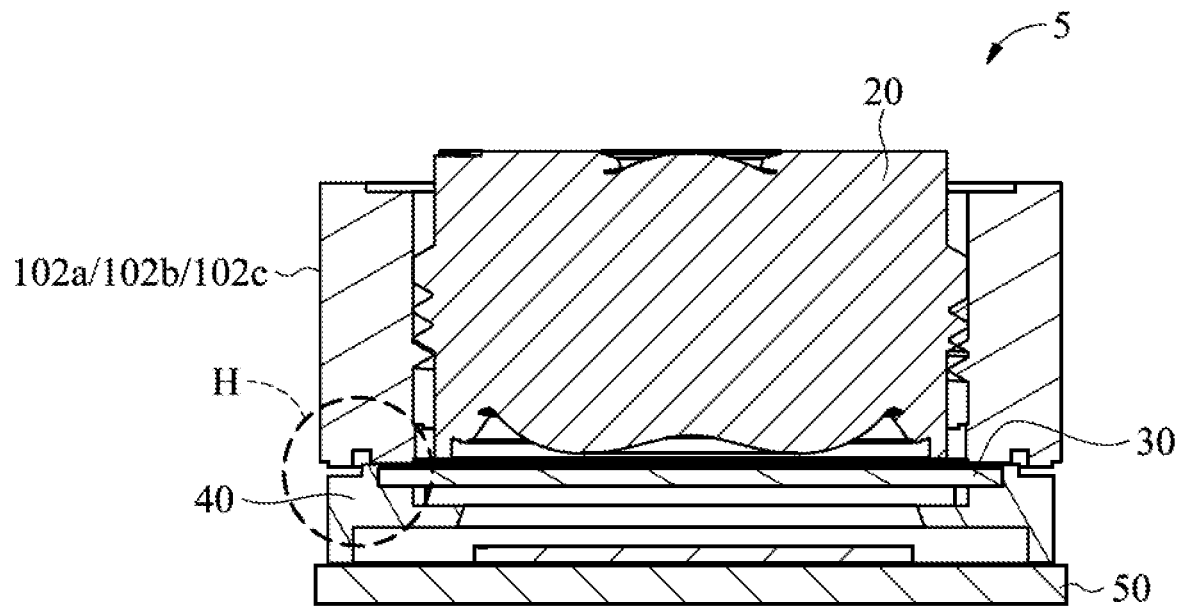
FIG. 6E is a cross-sectional view along line A-A' in FIG. 6A.
Figure 6F:
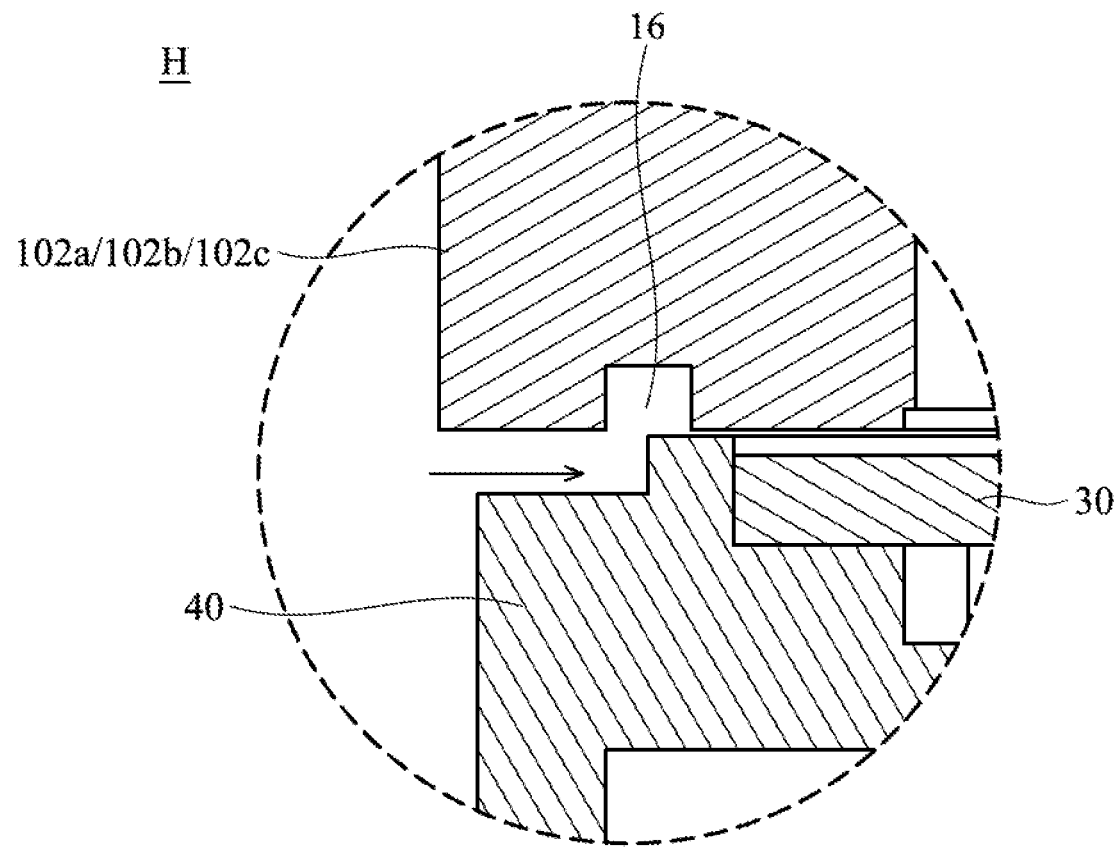
FIG. 6F is an enlarged view of the portion H in FIG. 6E.

FIGS. 6A-6F illustrate a driving module, according to some other embodiments of the present invention. FIG. 6A is a perspective view of a driving module 5, FIGS. 6B-6D are bottom views of the holder assemblies 102a, 102b and 102c, respectively, FIG. 6E is a cross-sectional view of the driving module 5 along line A-A' in FIG. 6A, and FIG. 6F is an enlarged view of the portion H in FIG. 6E. It should be noted that line A-A' does not pass through the positioning components 14 in this embodiment, so no positioning component 14 is shown in FIGS. 6E and 6F. In FIGS. 6B-6D, a recess 16 is disposed on surfaces, of the holder assemblies 102a, 102b and 102c, facing the sensor module 2, wherein its shape and position may be determined based on design requirements. For example, in FIG. 6B, a plurality of L-shaped recesses 16 are disposed at the corners of the holder assembly 102a. In FIG. 6C, not only may the recesses 16 be disposed at the corners of the holder assembly 102b, but also striped recesses 17 may be disposed adjacent to the center of the sides of the holder assembly 102b. Because of the space at the center of the sides of the holder assembly 102b is relatively small, the recesses 17 are disposed in a position farther away from the through hole 12 (i.e. closer to the sides of the holder assembly 102b) rather than being connected to the recesses 16, which are disposed in the corner. However, depending on design requirements, some recesses 16 may be connected and close to the center of the side of the holder assembly, such as the recess 16 at the lower side of the holder assembly 102. The shape of the recess 16 is not limited to a linear shape. For example, the recess 16 of the holder assembly 102c in FIG. 6D has a circular shape and surrounds the through hole 12.

After the holder assembly and the sensor module 2 are aligned, they are required to be adhered by glue (e.g. thermoset or photocurable adhesives) and thus prevent the unwanted entry of foreign objects into the driving module. The flow direction of the glue may be controlled by the presence of recesses 16 and 17 on the holder assembly. For example, as shown in FIGS. 6E and 6F, the glue is injected from the outermost part of the driving module to a place between the holder assembly 102a/102b/102c and the base 40 by dispensing it, i.e. through the direction of the arrow in FIG. 6F, which is from the outer part to the inner part of the driving module 5. Because the flow direction of the glue may be controlled by the presence of recess 16 on the holder assembly 102a/102b/102c, the glue may be prevented from flowing into the driving module, such as by flowing into the optical element 20 or the filter 30, etc. On the other hand, the glue may flow through the recess 16 and be evenly distributed in the whole gap to achieve all-edge-sealing. As a result, the strength of adhesion may be guaranteed, and unwanted foreign objects may be prevented from entering the driving module.

The manners of dispensing glue may be divided into two types: dispensing glue first, and then applying force to seal the holder assembly and the sensor module, or applying force to seal the holder assembly and the sensor module first, and then applying glue. The position for the application of glue is close to the recesses 16, and is far from the place where no recess 16 is disposed (e.g. close to the optical element 20) and far from the positioning components 14 to ensure that the glue flows though the recesses 16.

Figure 6G:
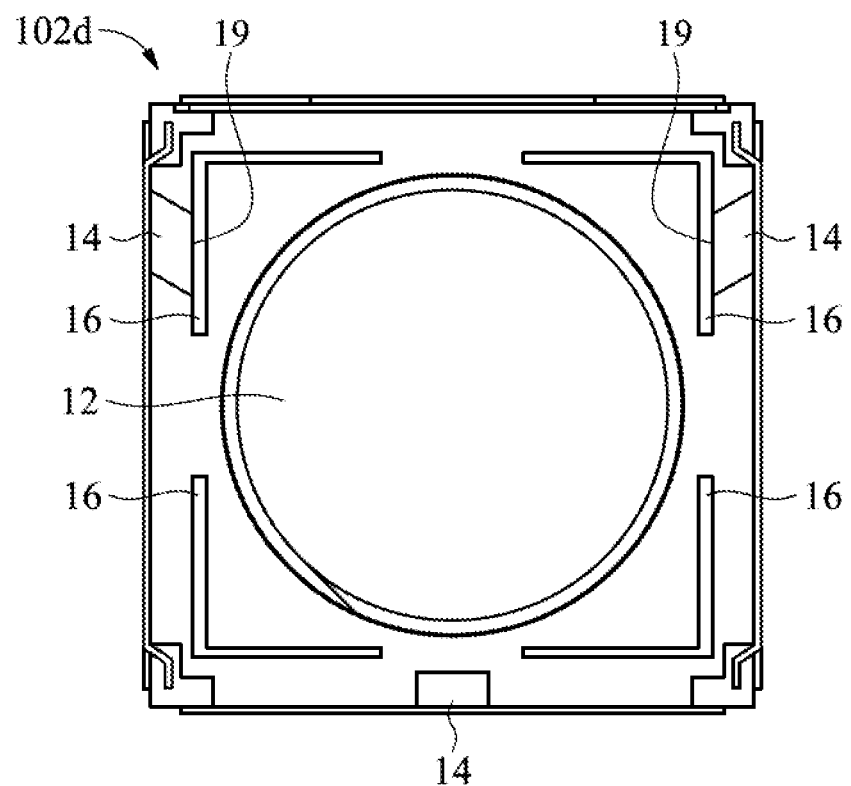
FIG. 6G illustrates some components of a driving module according to a further embodiment of the present invention.

Although the positioning components 14 and the recesses 16 in the previous embodiments are illustrated as being separated from each other, the present invention is not limited thereto. For example, refer to FIG. 6G, which is a bottom view of a holder assembly 102d of another embodiment of the present invention. In FIG. 6G, the positioning components 14 adjoin the recesses 16, and they have the same sidewall 19. In this manner, the space in the driving module may be utilized more effectively, thereby achieving mechanism miniaturization.

Furthermore, although the positioning components 14 and the holder component 102d are illustrated as being formed together as one piece, the present invention is not limited thereto. For example, the positioning components 14 and the holder assembly 102d may be disposed separately, and they may be formed of different materials, such as a plastic holder assembly 102d and metal positioning components 14. Because the accuracy of metal forming is relatively high, the assembly accuracy may be further enhanced by using metal positioning components 14 to solve the problem of images coming out blurry due to poor accuracy during assembly.

Figure 7A:
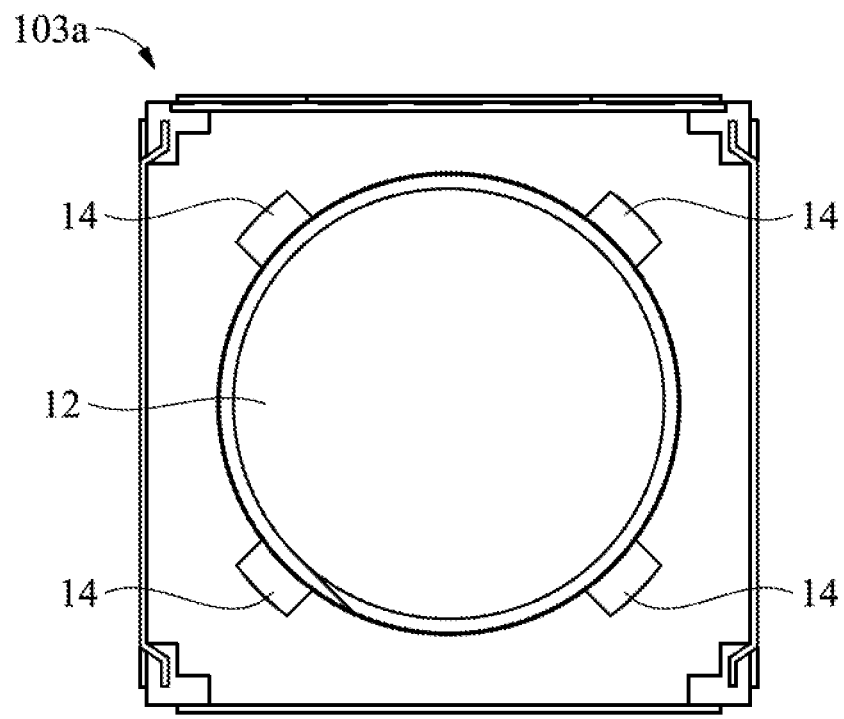
FIGS. 7A-7B illustrate some components of a driving module according to some other embodiments of the present invention.
Figure 7B:
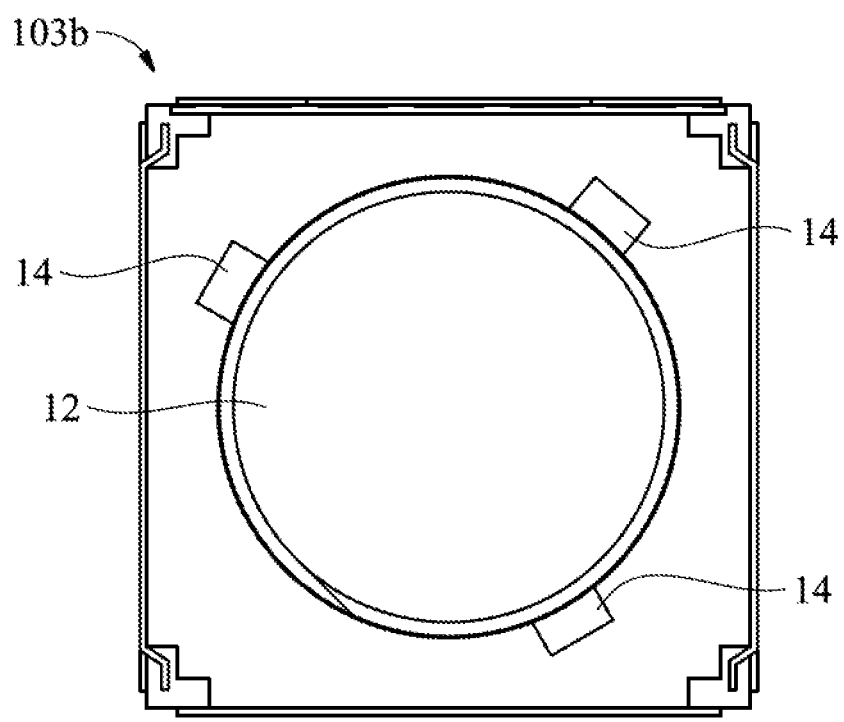

FIGS. 7A and 7B are bottom views of holder assemblies 103a and 103b, respectively, of some other embodiments of the present invention. Three positioning components 14 are disposed on each holder assembly in the aforementioned embodiments, but the present invention is not limited thereto. For example, depending on design requirements, four positioning components 14 are disposed on the holder assembly 103a, are adjacent to the through hole 12, and form a plane, wherein the optical axis O of the optical element 20 may pass through a polygonal area formed by the positioning components 14 to prevent the tilting problem caused by the centers of gravity of the holder assembly 103a and the optical element 20 deviating from the plane formed by the positioning components 14.

Furthermore, the positions in which the positioning components 14 are disposed may be altered depending on the position of other elements in the driving module. For example, the positioning components 14 are disposed at the edge of the through hole 12 in the holder assembly 103b of FIG. 7B. The triangle formed by the three positioning components 14 of holder assembly 103b is not an isosceles triangle like that of holder assembly 101 in FIG. 5B, but the centers of gravity of the holder assembly 103b and the optical element 20 and the optical axis O of the optical element 20 are still in the triangular area, thereby preventing problems caused by tilting.

Figure 8A:
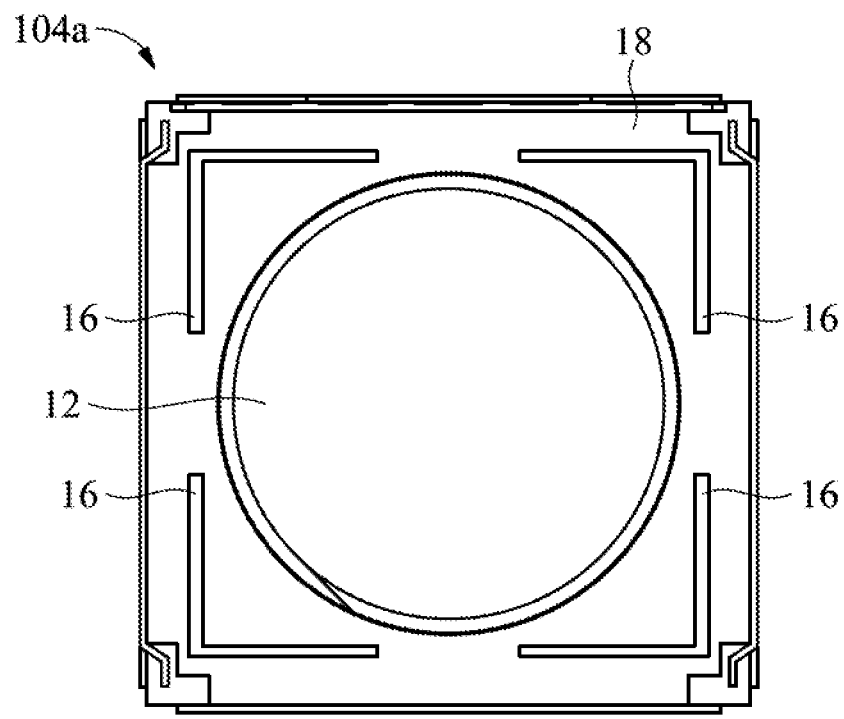
FIGS. 8A-8C illustrate some components of a driving module according to some other embodiments of the present invention.
Figure 8B:
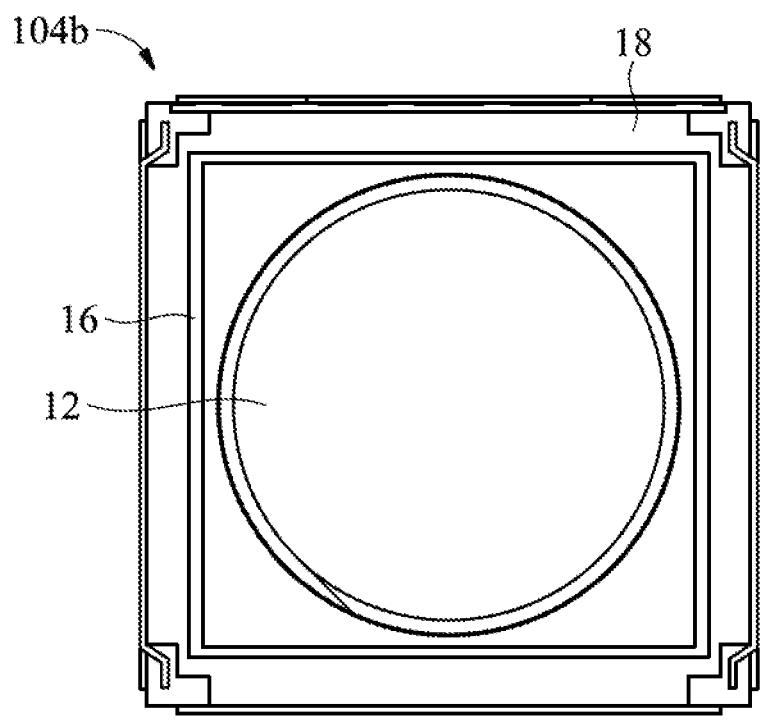
Figure 8C:
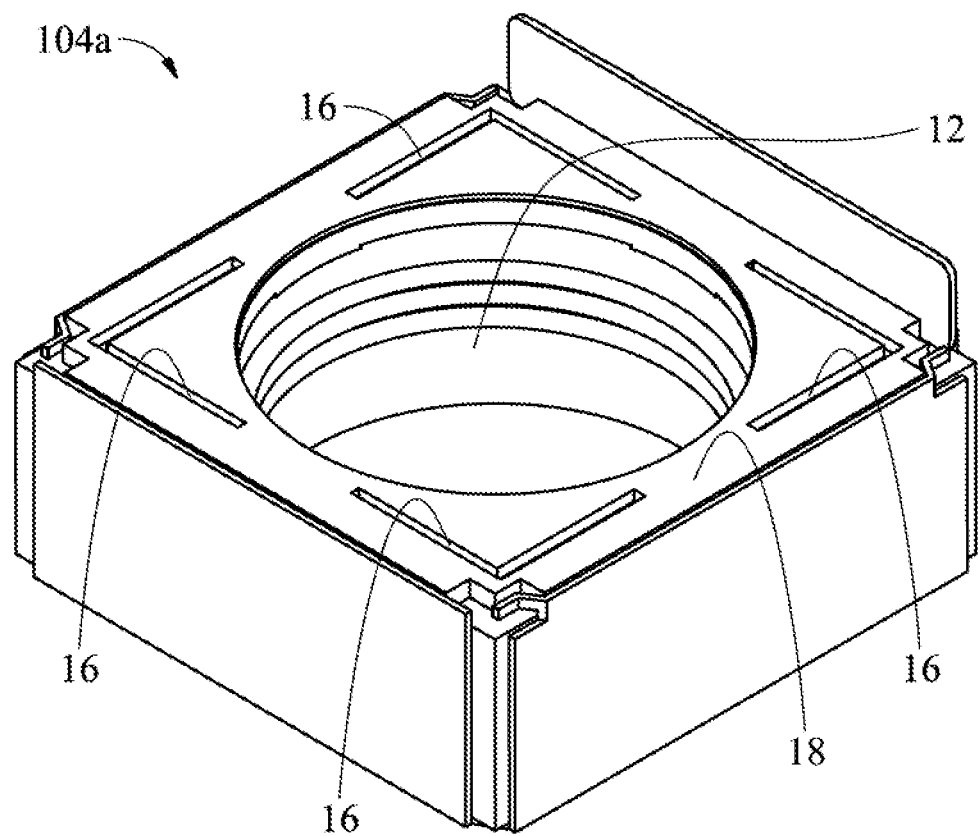

In the aforementioned embodiments, the positioning components 14 are disposed in the driving module to solve the problem of parallelism during assembly, but the present invention is not limited thereto. For example, FIGS. 8A-8C illustrate a holder assembly of some other embodiments of the present invention. As shown in FIGS. 8A, 8B and 8C, which are bottom views of the holder assemblies 104a, 104b and a perspective view of the holder assembly 104a, respectively, no positioning component 14 is disposed on the holder assemblies 104a and 104b, and their bottoms 18 are made from metal. Because the metal bottom 18 has a relatively high planeness, and the recess 16 may be formed by etching or another method, the accuracy of the obtained recess 16 and the bottom 18 may be relatively high to further enhance the parallelism between the elements in the driving module. As a result, the problem of blurry images caused by the non-parallel assembly of the elements may be reduced.

Figure 9A:
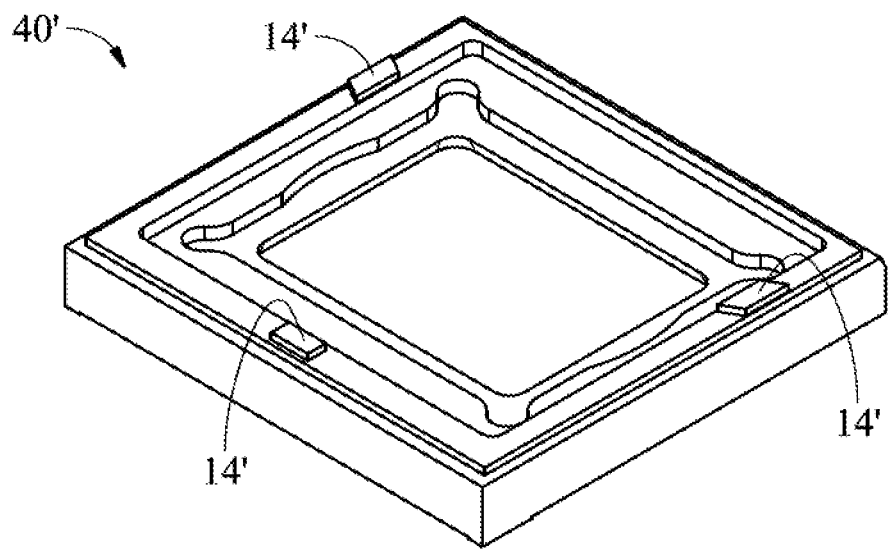
FIGS. 9A-9B illustrate some components of a driving module according to some other embodiments of the present invention.
Figure 9B:
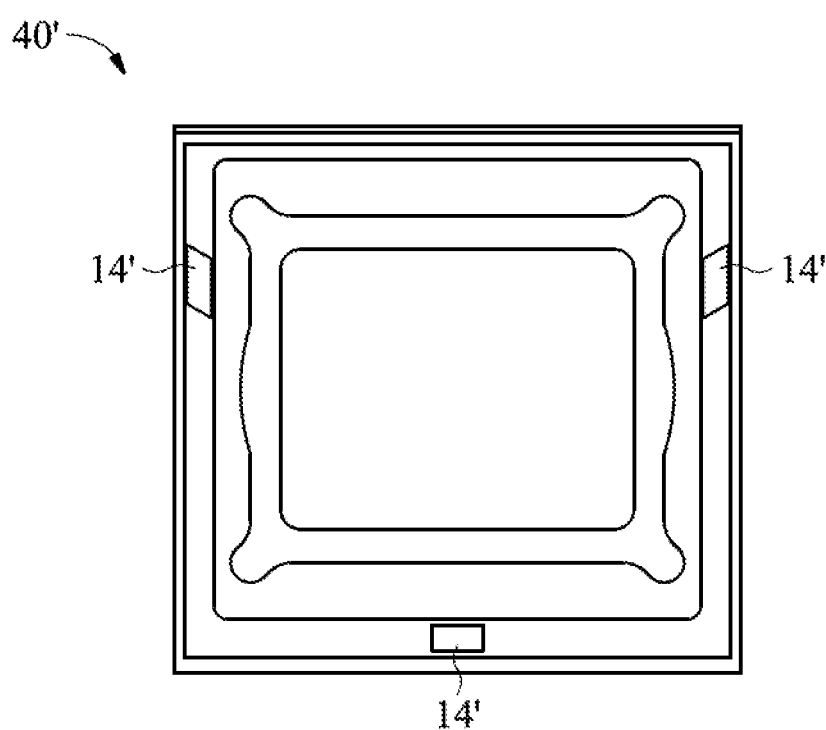
Figure 9C:
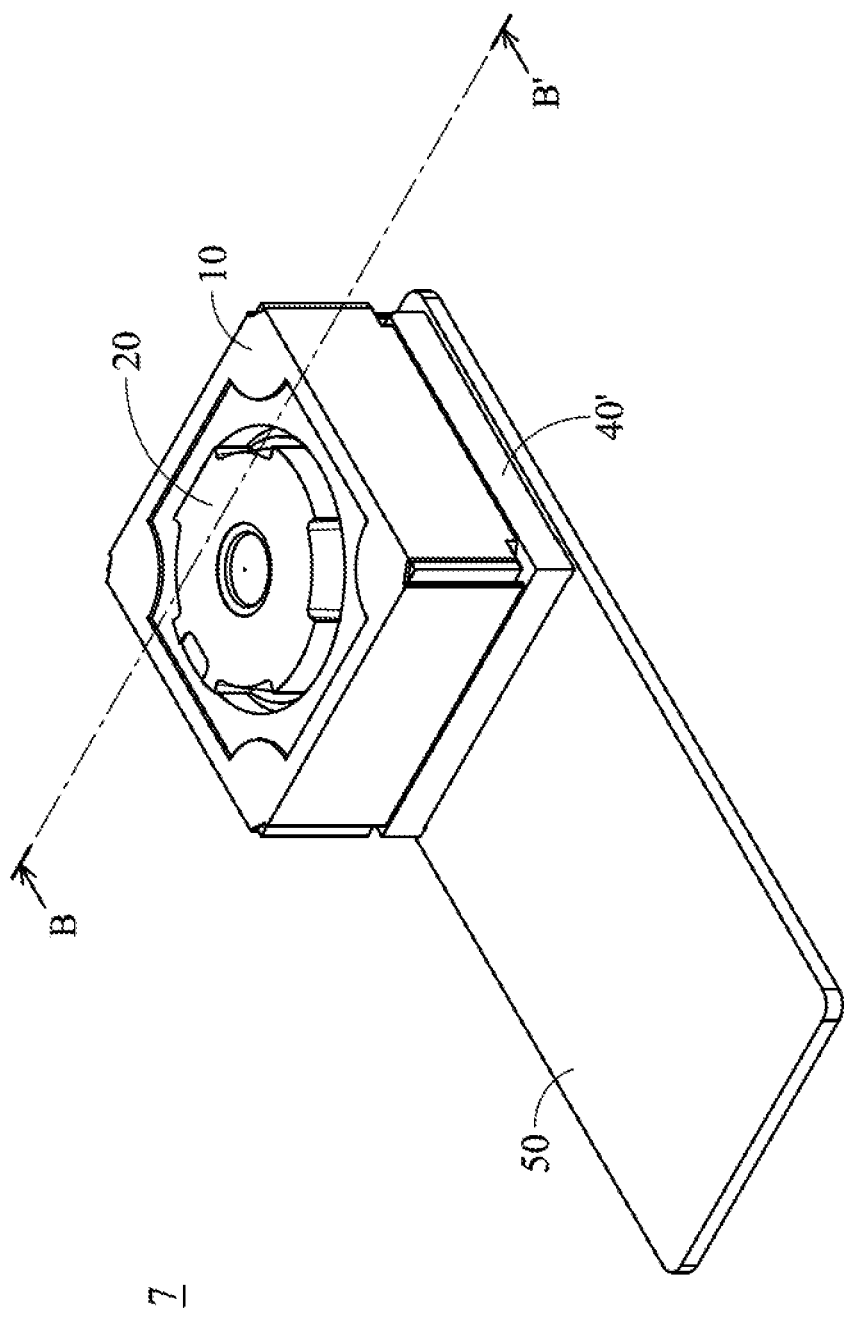
FIG. 9C is a perspective view of a driving module according to some other embodiments of the present invention.
Figure 9D:
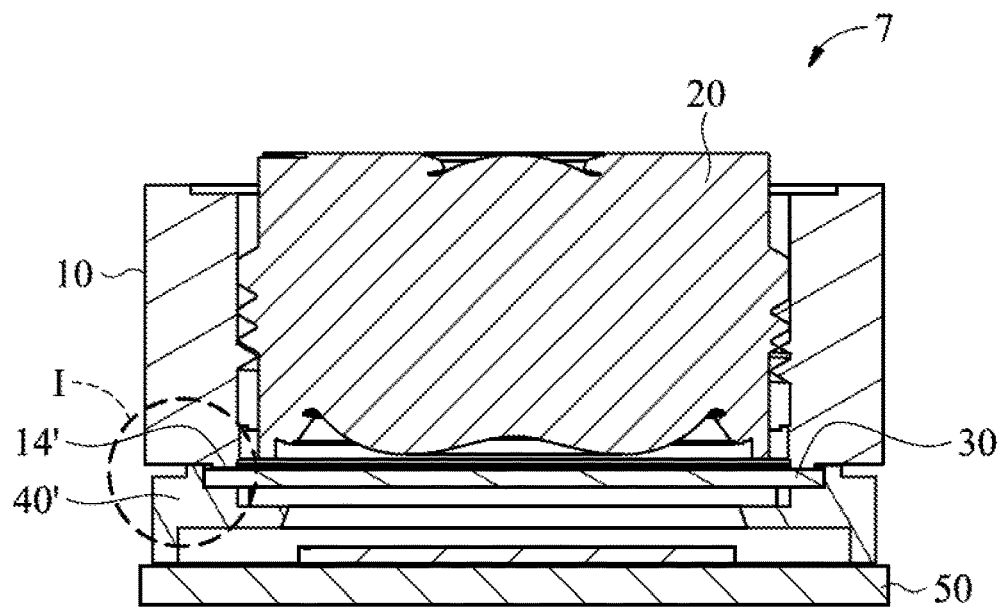
FIG. 9D is a cross-sectional view along line B-B' in FIG. 9C.
Figure 9E:
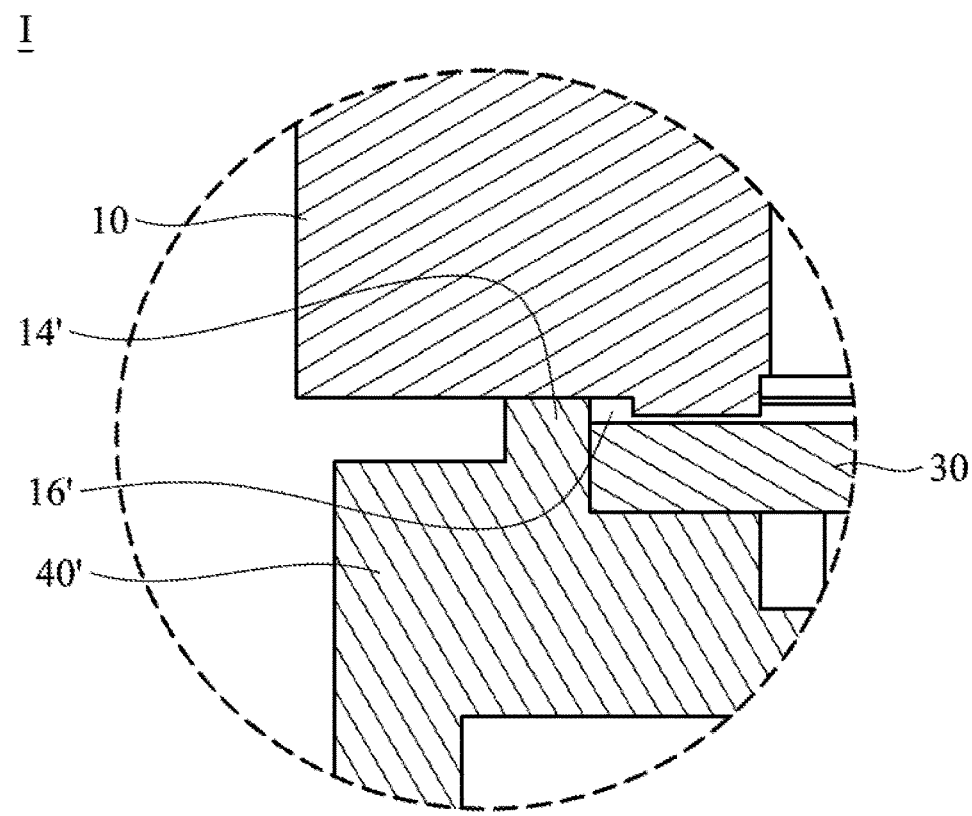
FIG. 9E is an enlarged view of the portion I in FIG. 9D.

In the aforementioned embodiments, the positioning components 14 and the recess 16 are disposed on the holder assembly, but the present invention is not limited thereto. For example, FIGS. 9A and 9B are a perspective view and a top view of a base 40' in a further embodiment of the present invention, respectively. As shown in FIGS. 9A-9B, three positioning components 14' are disposed at the top surface of the base 40' rather than on the holder assembly. FIG. 9C is a driving module 7 which has a base 40'. FIG. 9D is a cross-sectional view of the driving module 7 along line B-B' in FIG. 9C, and FIG. 9E is an enlarged view of portion I in FIG. 9D. In FIG. 9E, the positioning components 14' abut the holder assembly 10. The center of gravity of the driving module and the optical axis of the optical element may pass through the triangle formed by the three positioning components 14' to provide a plane with higher parallelism during assembly.

In summary, a plurality of embodiments for solving the accuracy problem when assembling the driving module are provided in this invention. The flatness during assembly may be effectively enhanced by the presence of at least three positioning components between the sensor module and the holder assembly, and the cost of processing may be reduced. A metal bottom with high accuracy may be utilized to achieve a similar effect. Furthermore, the recesses between the sensor module and the holder assembly may allow glue to flow therein to achieve better adhesion and all-edge-sealing.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A driving module, comprising:
    a sensor module;
    a holder assembly corresponding to the sensor module for holding an optical element having an optical axis, wherein the holder assembly comprises a first surface facing the sensor module, the first surface is perpendicular to the optical axis, and the first surface overlaps at least a portion of the sensor module when viewed along the optical axis; and
    at least three positioning components disposed between the sensor module and the holder assembly, wherein the positioning components extend in a direction that is parallel to the optical axis, and the first surface overlaps at least a portion of the positioning components when viewed along the optical axis.

2. The driving module as claimed in claim 1, wherein the holder assembly is integrally formed with the position components as one piece.

3. The driving module as claimed in claim 1, wherein the sensor module comprises a base integrally formed with the position components as one piece.

4. The driving module as claimed in claim 1 further comprising a filter disposed between the sensor module and the holder assembly.

5. The driving module as claimed in claim 4, wherein the positioning components abut the filter.

6. The driving module as claimed in claim 1, wherein the positioning components comprise metal material.

7. The driving module as claimed in claim 1, wherein the holder assembly comprises a recess disposed on a surface, of the holder assembly, facing to the sensor module.

8. The driving module as claimed in claim 7, wherein the holder assembly further comprises a plurality of recesses disposed on the surface.

9. The driving module as claimed in claim 7, wherein a sidewall of the positioning components is coplanar to a sidewall of the recess.

10. The driving module as claimed in claim 8, wherein a sidewall of the positioning components is coplanar to a sidewall of the recess.

11. The driving module as claimed in claim 7, wherein the holder assembly has a rectangular shape, and the recess is at a corner of the holder assembly.

12. The driving module as claimed in claim 8, wherein the holder assembly has a rectangular shape, and the recess is at a corner of the holder assembly.

13. The driving module as claimed in claim 1, wherein the holder assembly has a rectangular shape, and the positioning components are at corners of the holder assembly.

14. The driving module as claimed in claim 1, wherein an optical axis of an optical element passes through a polygonal area formed by the positioning components.

* * * * *